(No Model.) 2 Sheets—Sheet 1.
H. W. LEONARD.
SYSTEM OF ELECTRICAL DISTRIBUTION.
No. 476,544. Patented June 7, 1892.
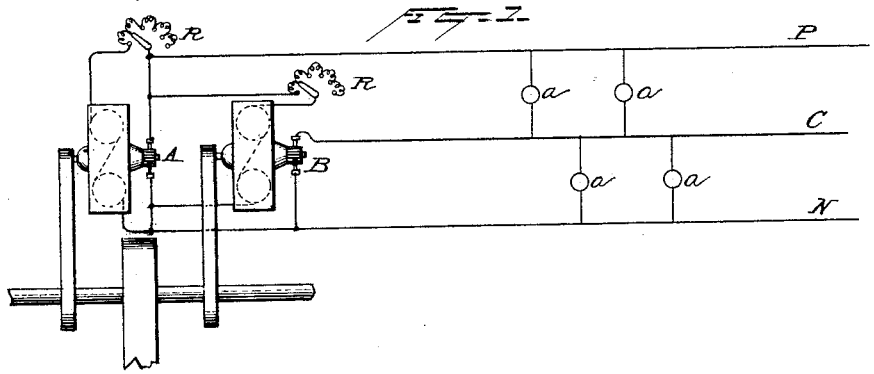
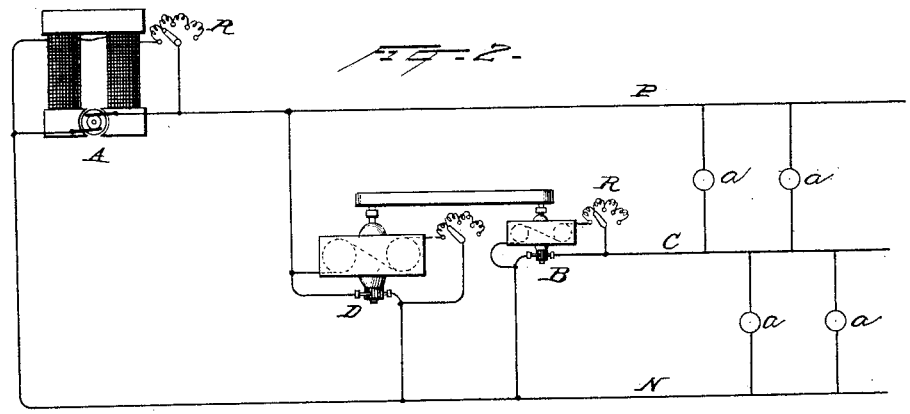
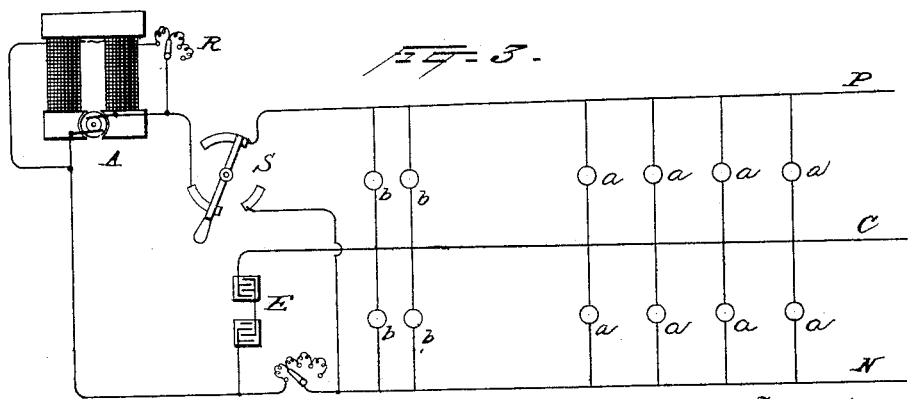
Witnesses
Norris S. Clark.
A. F. Oberly
Inventor
Harry Ward Leonard
By his Attorneys

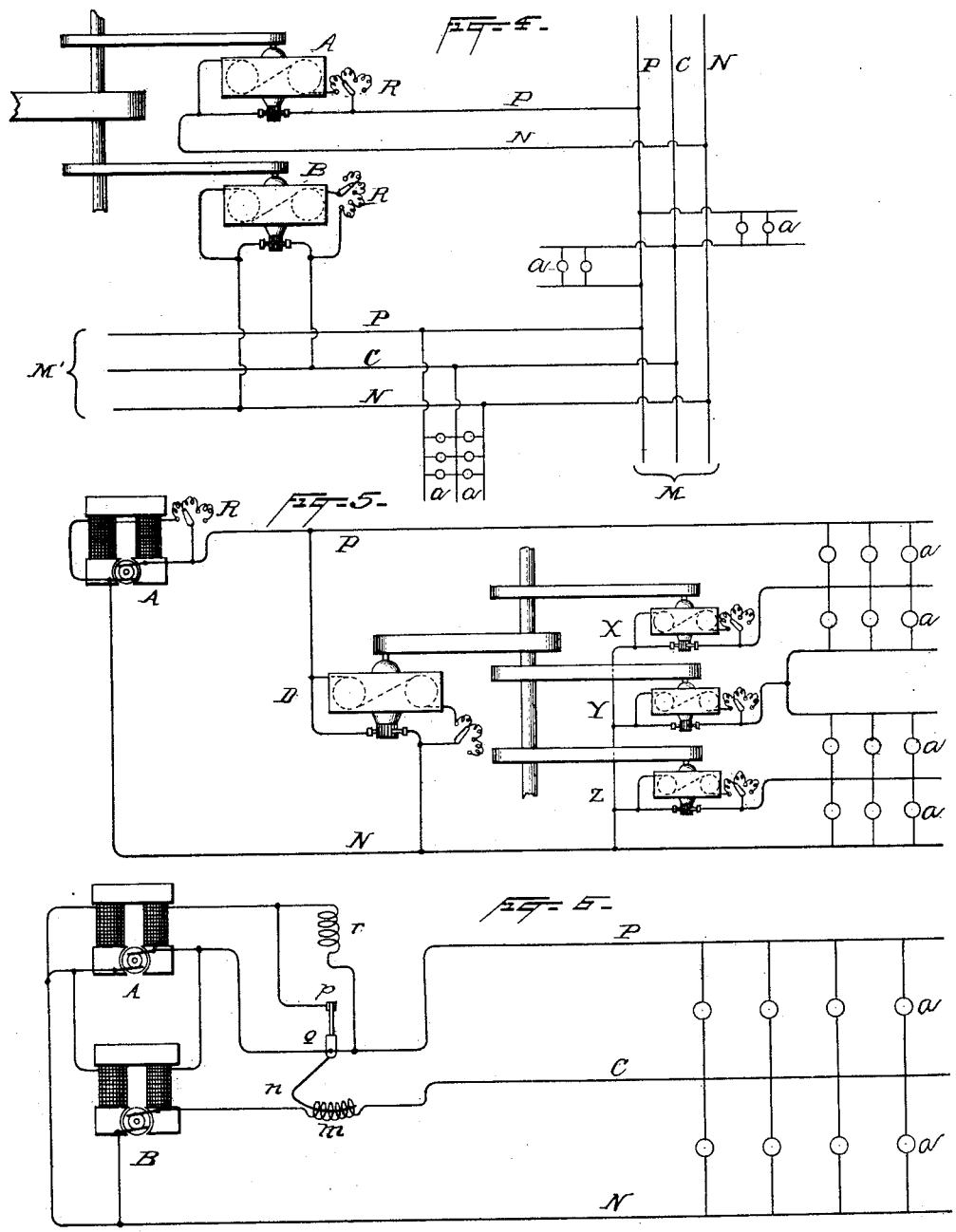

UNITED STATES PATENT OFFICE.

HARRY WARD LEONARD, OF NEW YORK, N. Y.

SYSTEM OF ELECTRICAL DISTRIBUTION.

SPECIFICATION forming part of Letters Patent No. 476,544, dated June 7, 1892.

Application filed December 28, 1891. Serial No. 416,293. (No model.) Patented in England February 5, 1892, No. 2,283.

*To all whom it may concern:*

Be it known that I, HARRY WARD LEONARD, a citizen of the United States, residing at New York city, in the county and State of New York, have invented certain new and useful Improvements in Systems of Electrical Distribution, of which the following is a specification.

My invention relates to series multiple systems of electrical distribution in which a compensating conductor is connected between the translating devices in series; and my object is to make the translating devices independent of each other, so that the same may be individually placed in circuit or removed therefrom without affecting the supply of current to the other translating devices.

In carrying my invention into effect I employ a generator of suitable electro-motive force to supply the translating devices in series, the same being connected with the positive and negative conductors or main conductors of the system, and between one of the said main conductors and the compensating or middle conductor I connect a compensating device which is an electrical generator of a character such that it acts either as a current-receiving or a current-producing device, such as a dynamo-electric machine capable of operating either as a generator or as a motor or a storage-battery. This compensating device is preferably one having a constant electro-motive force, with means for varying the same at the will of the operator. By this means the potential on the compensating conductor is kept constant relative to the potential of the other conductors and independent of the load, for when the load is out of balance the compensating device either receives as a current-receiver the excess of current due to decreased load on one side or sends out as a current-producer the additional current necessary to supply an increased load, according to which side of the system preponderates over the other. Preferably the electrical or mechanical connections of the compensating device are such that when it takes energy from the side of the system with which it is connected it at the same time returns energy to the system as a whole, and such that when it takes energy from the system as a whole it returns it to the side of the system with which it is connected. In no case does it act to take energy from one side of the system and transfer it to the opposite side, it being connected with one side of the system only.

My invention is illustrated in the accompanying drawings.

Figure 1 is a diagram of a form of my invention in which a dynamo-electric machine is employed as the compensating device, and Fig. 2 a diagram of an arrangement in which the compensating device is placed at a distance from the generating-station. Fig. 3 shows in diagram the use of a storage-battery. Fig. 4 is a diagram showing my invention applied to a feeder system; Fig. 5, a diagram of an extension of the system of Fig. 2, and Fig. 6 illustrates a safety device which I may employ in connection with my invention.

Referring first to Fig. 1, P N are the main conductors, and C is the compensating conductor of the system. Incandescent-electric lamps or other translating devices $a$ $a$ are connected in series across the main conductors with the compensating conductor connected between the groups, as in the common three-wire system.

A is a dynamo-electric machine connected one pole to conductor P and the other to conductor N, the machine being preferably one of the constant-potential type and its electro-motive force being such as to supply the groups of translating devices in series.

B is another dynamo-machine of one-half the electro-motive force of A and run by the same engine or prime motor as A, this being indicated in the drawings by showing the two machines belted to the same counter-shaft. The field-magnet of dynamo B is maintained at a practically constant strength, either by a shunt-circuit from A, as shown, by a separate exciter, or in any other suitable manner.

It will be seen that when, as shown in the drawings, the number of lamps on the P side of the system is equal to that on the N side the dynamo B will simply maintain the natural potential on the compensating conductor, due to the drop of potential from P to N, and so all the current of A will pass through the lamps from conductor P to conductor N. If, however, lamps are removed from the P side of the system, the dynamo B, running as a generator, operated by the mechanical energy of the prime motor, and maintaining the potential of C constant, will produce the current necessary to supply the greater number of lamps on the N side, such current passing from B along C through said lamps to N. On the other hand, if lamps are added to the P side, so that the number on that side is greater than that on the N side, the dynamo B will serve to take the surplus energy away from its own side of the system, current will return through C to dynamo B, and the same will run as a motor, and thereby assist the prime motor in operating the generator A and assist in supplying energy to the system as a whole. Since the field-magnet of B is not affected by the current on the compensating conductor, the strength of such field-magnet remains practically constant. Adjustable resistances R may, however, be provided in the field-circuits of both A and B to compensate, when necessary, for the drop on the conductors. By thus providing means whereby the electro-motive force of B may be regulated at the will of the operator I am enabled to provide for the difference of potential on the neutral between the compensating device and the translating devices when a difference of balance exists on the system.

In Fig. 2 the compensating dynamo B is placed at a distance from the main generating-station and is run as a generator by an electric motor D, connected across the conductors P N, the operation being the same as already described, except that when the compensating device delivers back energy to assist the generator A and when it takes energy from the prime motor to deliver it to the N side of the system it is electrical instead of mechanical energy.

In Fig. 3 the compensating device consists of a storage-battery E, electrically connected with relation to the conductors P, N, and C and the dynamo A in the same manner as is the compensating dynamo B in Fig. 1, and acting to maintain a constant potential on the compensating conductor relative to the potential of the other conductors, being charged when the load is greater on the P side and discharging into the N side when the latter has the greater load. Another feature of this arrangement is that during the period of a heavy load lamps b b in the central station may be connected by switches, so as to throw the load on the side to constantly charge the battery, and after midnight or in the daytime, when the load is light, the storage-battery may be used alone to supply the translating devices by connecting the system into a two-wire multiple-arc system by the usual breakdown-switch S, the generator A being then shut down.

In Fig. 4, M and M' are mains of a three-wire distribution system. P N is a two-wire feeder connected with the main M at a point distant from the station, said feeder being connected with the terminals of the main generator A. The main M' is considered to be that which passes nearest to the central station, and the compensating generator B is connected between the neutral conductor and one of the outside conductors of that main. It will be seen that this makes the electrical connections the same in principle as in Fig. 1, except that the field-magnet of B is not in a shunt-circuit from the machine A, the compensating device being connected between the neutral wire and one of the main wires between which the main generator is connected. By the arrangement shown in Fig. 4 the compensating device B is made independent of the drop on the feeders, and so does not have to be regulated to compensate for such drop. This arrangement results, also, in permitting the neutral wires to be done away with on all the feeders.

In Fig. 5, which is a more extended system of the general plan shown in Fig. 2, the motor situated at a distance from the station and connected across the main conductors P N drives three dynamo-electric machines of different potentials—that is to say, if the difference of potential on the mains is four hundred and forty volts the dynamo X will be of three hundred and thirty volts, dynamo Y two hundred and twenty volts, and dynamo Z one hundred and ten volts. In such case in order to allow for the drop in potential on the conductors the main generator may have an electro-motive force of about five hundred volts, the motor being wound for four hundred and forty volts. The system contains four groups of lamps in series with each other, each of the three dynamos being connected with a conductor which extends between the lamps of two groups and having its other terminal connected with the main conductor N. The dynamos X Y Z act to receive energy from the system or to return energy thereto, according to the relative number of lamps on each side of the compensating conductor whose potential is kept constant by each machine.

In Fig. 6 I have illustrated a safety device designed to prevent accidents due to a short circuit between the neutral and one of the outside wires. Such a short circuit would cause the whole potential of the main generator to be thrown upon one group of lamps. In order to prevent this, I place in shunt-circuit to the field of A the resistance $r$ and in the compensating wire C a coil $m$, within which is a movable core $n$, carried by a pivoted contact-lever $o$, which normally rests on the contact-plate $p$, completing a short circuit around the resistance $r$. It will be seen that on the occurrence of an abnormal current in either direction on the compensating conductor C the core $n$ will be drawn in and the contact-lever $o$ will leave contact-plate $p$, removing the short circuit, thus placing the resistance $r$ into the field-circuit of generator A without breaking the field-circuit, whereby the potential of said generator will be reduced to such a point as will not injure the lamps.

What I claim is—

1. In a system of series multiple electrical distribution, the combination of main conductors, groups of translating devices in series between them, a compensating conductor connected between the translating devices, an electrical generator connected between the said main conductors, and a compensating device of constant difference of potential serving either to receive or produce electrical energy as the excess of load shifts from one side of the compensating conductor to the other, such device being connected between the compensating conductor and one of said main conductors, the compensating conductor being connected with the other main conductor through the translating devices only, substantially as set forth.

2. In a system of series multiple electrical distribution, the combination of main conductors, groups of translating devices in series between them, a compensating conductor connected between the translating devices, an electrical generator connected between the said main conductors, and a compensating device connected between the compensating conductor and one of said main conductors only and serving as the excess of load shifts from one side of the system to the other to either take energy from the prime motor and supply it to the side of the system with which it is connected or take energy from its side of the system and supply it to the prime motor, said compensating device having a constant difference of potential between its terminals, substantially as set forth.

3. In a series of electrical distribution, the combination of main conductors, groups of translating devices in series between them, a compensating conductor connected between the translating devices, an electrical generator connected between the said main conductors, and a constant-potential dynamo-electric machine connected between the compensating conductor (the compensating conductor being connected with the other main conductor through the translating devices only) and one of the other conductors and operating either as a motor or as a generator as the excess of load shifts from one side of the compensating conductor to the other, substantially as set forth.

4. In a system of electrical distribution, the combination of main conductors, groups of translating devices in series between them, a compensating conductor connected between the translating devices, a dynamo-electric machine connected between the said main conductors, and a constant-potential dynamo-electric machine connected between the compensating conductor and one of the other conductors, both of said dynamo-electric machines being operated by the same prime source of power, substantially as set forth.

5. In a system of electrical distribution, the combination of main conductors, groups of translating device in series between them, a compensating conductor connected between the translating devices, a generator having an electro-motive force and current capacity suitable to operate all the translating devices under conditions of perfect balance, and a compensating device of constant difference of potential serving either to receive or produce electrical energy as the excess of load shifts from one side of the compensating conductor to the other, such device being connected between the compensating conductor and one of said main conductors, the compensating conductor being connected with the other main conductor through the translating devices only, substantially as set forth.

6. In a system of electrical distribution, the combination of main conductors, groups of translating devices in series between them, a compensating conductor connected between the translating devices, a dynamo-electric machine connected between the said main conductors, and a constant-potential dynamo-electric machine connected between the compensating conductor and one of the other conductors, both of said dynamo-electric machines being mechanically connected with the same engine or prime motor, substantially as set forth.

7. In a system of electrical distribution, the combination, with three-wire mains, of a two-wire feeder, a generator connected with said feeder and having sufficient electro-motive force to supply the translating devices in series, and an auxiliary generator of different electro-motive force from the main generator and connected between the compensating conductor and one of the outer conductors of one of the three-wire mains, substantially as set forth.

8. In a system of series multiple electrical distribution, the combination of main conductors, groups of translating devices in series between them, a compensating conductor connected between the translating devices, an electrical generator connected between the said main conductors, and a compensating device serving either to receive or produce electrical energy as the excess of load shifts from one side of the compensating conductor, such device being connected between the compensating conductor and one of said main conductors and being provided with means for regulating its electro-motive force, substantially as set forth.

9. In a system of series multiple electrical distribution, the combination of main conductors, groups of translating devices in series between them, a compensating conductor connected between the translating devices, an electrical generator connected between the said main conductors, and a dynamo-electric machine connected between the compensating conductor and one of the other conductors, provided with means for regulating its electro-motive force and operating either as a motor or as a generator as the excess of load shifts from one side of the compensating conductor to the other, substantially as set forth.

10. The combination of the three conductors, the groups of translating devices in series between the outer conductors, the main generator connected between said outer conductors, the compensating device connected between the middle conductor and one of the outer ones, and a safety device operated by abnormal variations of current in said conductor to reduce the electro-motive force of said main generator, substantially as set forth.

11. The combination of the three conductors, the groups of translating devices in series between the outer conductors, the main generator connected between said outer conductors, the compensating device connected between the middle conductor and one of the outer ones, a resistance in the field-circuit of said main generator, and an electro-magnetic device operated by abnormal currents in the middle wire for throwing said resistance into circuit, substantially as set forth.

This specification signed and witnessed this 22d day of December, 1891.

H. WARD LEONARD.

Witnesses:
 W. PELZER,
 A. L. VANCE.